United States Patent [19]
Vera

[11] Patent Number: 4,838,072
[45] Date of Patent: Jun. 13, 1989

[54] METHOD AND APPLIANCE FOR EVALUATING THE SOUND EMISSION PROPERTY OF HOLLOW COMPONENTS

[75] Inventor: Jean C. Vera, Valentigney, France

[73] Assignee: ECIA - Equipements et Composants Pour L'Industrie Automobile, Audincourt, France

[21] Appl. No.: 129,194

[22] Filed: Dec. 7, 1987

[30] Foreign Application Priority Data

Dec. 11, 1986 [FR]  France .................... 86 17370

[51] Int. Cl.$^4$ ............................ G01M 19/00
[52] U.S. Cl. ............................ 73/37; 73/118.1
[58] Field of Search .............. 73/118.1, 117.3, 116, 73/37

[56] References Cited

U.S. PATENT DOCUMENTS 2,821,851  2/1958  Daley ........................... 73/37

FOREIGN PATENT DOCUMENTS 27039  2/1983  Japan ........................... 73/37
113511  2/1978  United Kingdom ............ 73/37

OTHER PUBLICATIONS

Hartwig, H. et al., Akustische ... Automobilentwicklung, From Techniches Messen Atm. Jrg. 45, No. 4, Apr. 1978, pp. 141-146.

Primary Examiner—Jerry W. Myracle
Attorney, Agent, or Firm—Sughrue, Mion, Zinn, Macpeak and Seas

[57] ABSTRACT

The proposed technique makes use of a non-deformable sealed tank (10) of specific volume, a pressurized-fluid supply (30) equipped with a connector (31) intended to be connected to an orifice in the hollow component (50), a liquid delivery (20) for filling and emptying the tank, once the component has been submerged in it, and a sensor (40) for detecting the variation in volume of the liquid in the tank resulting from the deformations of the casing of the component which are caused by the set pressure of the fluid prevailing in it. The invention is used to assess the probable emission capacity of components during their design, in particular intake-line of motor-vehicle engines.

13 Claims, 2 Drawing Sheets

METHOD AND APPLIANCE FOR EVALUATING THE SOUND EMISSION PROPERTY OF HOLLOW COMPONENTS

The invention relates to sound-wave emissions and is concerned, more particularly, with assessing the sound emission property of hollow components.

The subjects of the invention are a method for evaluating the sound emission capacity of hollow components, an equipment for carrying out this method in particular, and the use of this method and/or this equipment for accessing the emission equipment of hollow property components for example those used in the motor vehicle industry.

In many domains of industry, there is the problem of sound emissions resulting from, among other things, the flow of a fluid, for example a gas in pipes. This arises particularly in the motor vehicle industry. As is known, a motor vehicle is equipped with an intake system essentially comprising ducts, air filters and distributors where air flows. This intake system extends from the outside-air admission port to the point where this air is mixed with the fuel which will form, with this air, the explosive mixture used to operate the engine.

Such a line collects outside air which is sucked in by the engine. this flow of gaseous fluid in pipes generates wave systems which exert fluctuating pressures on the duct walls which have a certain amount of elasticity; these walls tend to undergo deformation and therefore vibrate. This conversion of the kinetic energy of the gas into vibrations of the walls generates sound waves which are dissipated into the environment, particularly outside the vehicle.

The sound level and noise frequency vary with the running speed of the engine; in fact, the engine running speed determines the flow rate and velocity of the intake air and consequently the sound-wave system set up in the intake line depending on the sound impedance of the latter, and this system, in proportion to its development, excites the resonant frequencies inherent in the components of this line.

It will be appreciated immediately that such a sound emission is particularly annoying, first and foremost as regards the comfort of the vehicle passengers and also for persons who are outside the vehicle. These noises are added to the engine noises and to the aerodynamic hissing of the air on the body of the vehicle when the latter is in motion.

According to ISO standards adopted internationally, sound measurements are usually made by means of third-octave filters centred on the reference frequency 1 kHz, with a geometric progression of ratio $\sqrt[3]{2}$, to guarantee consistent results, whatever the origin of the filter used.

So that the subjective effects of a sound on the human ear can be assessed, not only its frequency, but also the sound pressure which it exerts must be taken into account. Thus, for each frequency used, the level of the sound pressure of this particular sound has to be changed if it is to be detected for all frequencies with the same force as at the reference frequency of 1 kHz.

To allow for this physiological phenomenon, the sound filters constructed have an electronic circuit of a sensitivity which varies with frequency in a way similar to the human ear. Depending on the particular levels, there are three different weightings which are conventionally designated by A, B and C and which are recognized internationally, especially the weighting A used most at low sound-pressure levels because it gives a very good approximation of the curve of equal perception.

Carrying out such measurements on a finished vehicle, whether at the workshop bench, for example in a dead room, or when it is moving on a road under true conditions, takes a long time and presents problems, particularly because it is especially difficult to identify and isolate the contribution of each sound source from all those generating the noise as a whole.

Faced with a problem such as this, it will be appreciated that it is of great practical importance to ensure that the various components and elements which, for instance, make up an intake line, such as, for example, air filters, distributors and intake pipes, have, from the time when they are designed, a shape and structure which makes them, as much as possible, incapable of undergoing elastic deformation under the effect of the flow of the air which they convey, so that, as far as possible, they are not sound sources.

There must therefore be provision for having available a simple and rapid technique which makes it possible to simulate the sound behaviour of the components and draw up a classification of these which is akin to that obtained by the standardized methods just described, without having the complexity of these.

The essential object of the invention is to develop a technique which makes it possible to study and therefore improve the behaviour of elastically deformable walls of casings, particularly of components used for intake lines of vehicles, for example motor vehicles.

The invention makes it possible to show the correlation which exists between the measurement of the deformation of the walls and their sound emission property measured by means of the standardized techniques of third-octave spectral analysis with the weighting A.

The subject of the invention is a method for evaluating the sound emission behaviour of hollow components, the casing of which delimits a cavity opening to the outside via at least one orifice. This method is characterized in that the hollow component is sealed, if appropriate, this orifice in the hollow component is connected to a source of fluid, for example air, the component so connected is submerged in a specific volume of an incompressible liquid, for example water, the cavity of the hollow component is filled with this fluid, the fluid in the cavity is pressurized, this pressure is varied, and the variation in volume of the liquid resulting from the deformations of the component casing which are caused by each set pressure of the fluid prevailing in it is measured.

The subject of the invention is also an equipment for carrying out the abovementioned method in particular, for evaluating the sound emission capacity of hollow components, the casing of which delimits a cavity opening to the outside via at least one orifice. This equipment is characterized in that it comprises a substantially non-deformable tank of specific volume and sealed relative to the liquid, a pressurized-fluid supply equipped with a connector to be connected to the orifice in the hollow component opening into its cavity, a liquid delivery for filling and emptying the tank, and a sensor for detecting the variation in volume of the liquid in the tank resulting from the deformations of the component casing which are caused by the set pressure of the fluid prevailing in it.

The invention also relates to the use of this method and/or this appliance for evaluating the sound emission capacity of components in the motor-vehicle industry, particularly intake-line components.

Other features of the invention will emerge from a reading of the following specification and claims and from an examination of the accompanying drawing which is given purely by way of example and in which:

The sound emission behaviour of components or articles which are subjected to vibrations is measured according to clearly defined standards adopted internationally. Consequently, everything regarding the practical details of this type of measurement will not be explained exhaustively, and the specification will be limited to the specific features of its characteristics.

Figure 1:
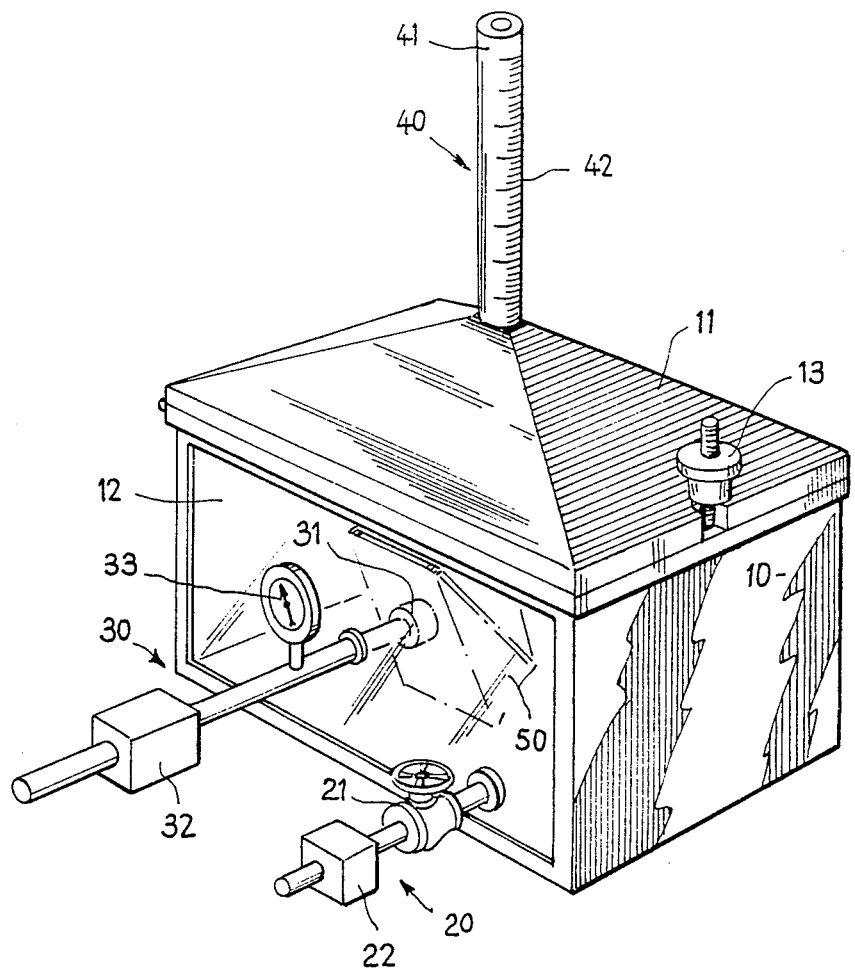
FIG. 1 is a diagrammatic view of an embodiment of an equipment according to the invention.

Reference will now be made to FIG. 1 which illustrates diagrammatically an embodiment of an equipment according to the invention.

The equipment comprises a substantially non deformable tank 10 of specific volume, on which is placed a cover 11 which is likewise substantially non deformable and which fits sealingly on it. This tank is preferably in the form of a parallelepiped or a cylinder, at least one 12 of the side faces of which is transparent, for example made of glass. For reasons which will be understood later, the walls of both the tank and the cover are sufficiently thick to ensure that their possible deformations can be considered of minor importance in relation to the phenomenon to be demonstrated.

Sealing between the tank and the cover is ensured in any suitable conventional way, by means of bearing surfaces and gaskets, and fastening is carried out, for example, by means of screws and nuts, as shown at 13.

A liquid delivery 20 opens into this tank and makes it possible to fill and empty the tank 10. This delivery is equipped with a tap 21 which makes it possible to shut off the volume of liquid introduced into the tank. The liquid used is preferably water.

A pressurized-fluid supply 30 also enters this tank through one of the walls, and its end located in the tank is equipped with a connector 31 for purposes which will be understood later. This supply of fluid, for example air, is equipped with a variable-flow pressure regulator 32 which makes it possible to vary the amount of pressure, measured by means of a pressure gauge 33, but slowly.

The cover 11 is placed on the top of the tank 10 and sealingly closes the upper part of the tank. This cover is preferably of pyramidal or conical shape. Its configuration is selected so as to prevent an air pocket from forming, for reasons which will be explained later. Arranged at the apex of the cover is a volume or pressure sensor 40, such as, for example, a water pressure gauge comprising a transparent tube 41, part of which has a graduation 42. This tube is, for example, a glass tube with a millimetre graduation.

The connector 31 located on the fluid supply 30 is, for example, of the "shap-action" type. It is intended to fit an orifice in a hollow component 50 to be studied.

The equipment according to the invention operates as follows.

The hollow component 50 to be studied, for example an intake manifold, is sealed beforehand, so as to leave free an orifice which opens into its cavity. This orifice is connected to the connector 31 of the fluid supply 30. The cover 11 is subsequently placed on the tank 10 and tight fit. The liquid delivery 20 is then opened in order to fill the tank with the liquid, for example water.

The water introduced into the tank is thoroughly degassed. For this purpose, the equipment is allowed to rest for a sufficient period of time or degassing techniques are employed, for example by heating or by ultrasonics, as indicated diagrammatically at 22. The importance of the geometry of the tank can thus be appreciated. With the chosen configuration, it will be seen that all the air dissolved in the liquid can travel towards the top of the equipment and escape through the tube 41 of the sensor, the free end of which is open.

When the liquid is considered sufficiently degassed, the measurements can be made.

Action is taken on the pressurized-fluid supply 30 to put the component studied under pressure in successive stages by means of the pressure regulator 32. The pressure prevailing in the cavity of the hollow component 50 causes deformations of the walls of its casing which result in a variation in the volume of the component. As mentioned, an incompressible liquid contained in a tank considered non-deformable is used. The variations in volume of the component studied make the volume of liquid contained in the tank change, and this change results in an alteration in the level in the graduated tube, which can thus be measured. In fact, the variation in volume of the component is equal to the variation corresponding to the amount of difference in level, multiplied by the cross-section of the tube. The choice of cross-section of the tube makes it possible to obtain the desired measuring accuracy.

If necessary, the appliance as a whole is placed in a temperature controlled chamber, and the temperature of the liquid and fluid is regulated in order to eliminate errors resulting from thermal fluctuations.

It will be seen that the measurements made in this way can be carried out statically, as shown, or dynamically. To make dynamic measurements, it is sufficient to open another orifice in the component and connect it, by means of a suitable connector, to an outward discharge pipe passing through the tank; it is then possible, in this way, to measure the deformations resulting from the continuous injection of gas into the component at a specific pressure, the value of which is a function of the flow-rate value.

Figure 3:
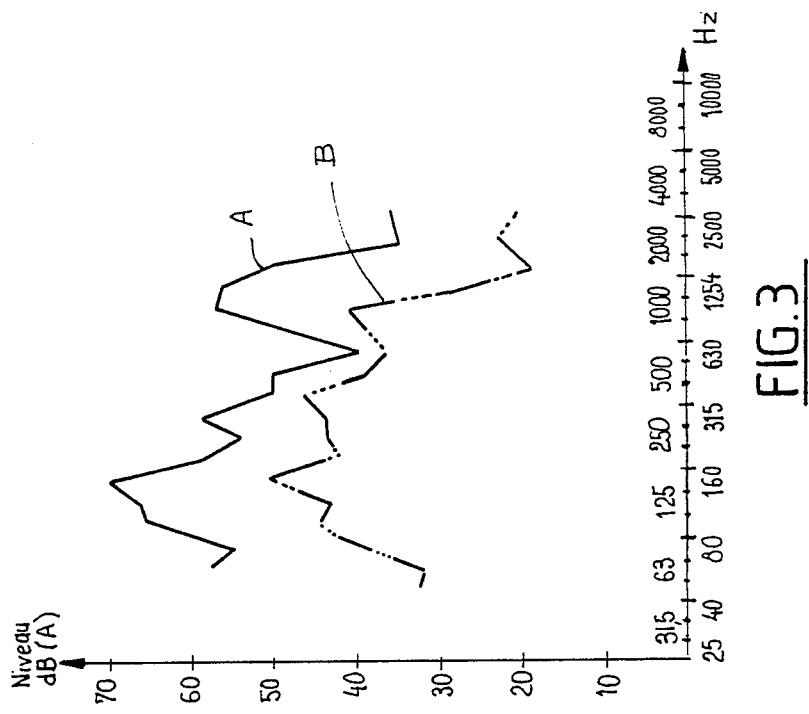
FIG. 3 is a graph illustrating the sound responses of the same two components, obtained by the standardized techniques with third-octave filters and the weighting A.
Figure 2:
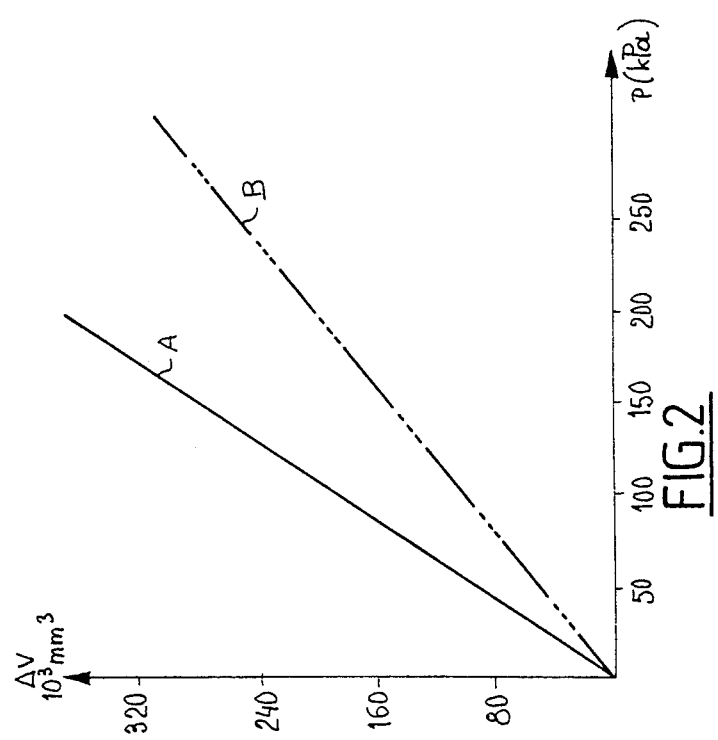
FIG. 2 is a graph illustrating the results of measurements made with the equipment of FIG. 1 by the method according to the invention of two identical components made of different materials.

Reference will be made to FIG. 2 which shows the variations in the volumes versus the pressure which is made to prevail in the hollow component studied. The graph shows the results for two identical components, one (A) made of polyurethane and the other (B) made of a resin reinforced with glass fibers. Referring to FIG. 3, this represents the soundresponse curves obtained by standardized techniques for the same two components. It will be seen that the two components used previously are classified in the same way, that is to say, that having the higher sound emission property is the one in which the variations in volume as a function of the pressure are the greatest.

The plots of graphs similar to that of FIG. 2 can be obtained automatically if the appliance is controlled by a programmable microcomputer, as is customary.

It can therefore be seen that, by means of the technique according to the invention, very easy and very rapid measurements can be carried out on isolated components. This has a great advantage in relation to the conventional technique of sound measurements made as a whole.

As is known, conventional sound measurements are carried out only on a finished vehicle, on which several sensors are located; the vehicle is made to move along or is placed in a dead room. The sound levels are then ascertained, but it is practically impossible to detect their exact origin and therefore to know which component has to be attended to to ensure that the overall sound level meets the standards laid down by the authorities. As a result of the invention, it is therefore possible to examine the various components one by one and make sure that each receives the particular configuration corresponding to the minimum variation in volume as a function of pressure.

This result can be achieved, for example, by acting on the thickness of the walls, by providing ribs or by adjusting the longitudinal profile of the components so as to select suitable radii of curvature for the bends and cross-sections. In fact, the sound responses of the components vary with the running speed of the engine which determines the velocity and rate of circulation of the air in the intake pipes. When all these components are combined, they have inherent resonant frequencies and sound impedancies which it is important to know in order to prevent these inherent resonant frequencies from being excited during the flow of the fluid, since it is at this very moment that the emitted sound level is the highest.

It can therefore be seen that, by means of the invention, a correlation between the deformation response and the sound emission capacity has been made, and that, as result of a relatively simple and rapid technique, it is possible to draw up a classification which sets the height of the sound levels which can truly be expected when the component studied is actually used on a vehicle. The component can therefore be modified during tests at the time when it is designed.

The invention has been described with reference to its use for particular components in the motorvehicle industry, but it is clear that it is not limited to this technical domain and that there are many other fields where it can be put into practice.

What is claimed is:

1. Method for evaluating the sound emission behaviour of a hollow component, the casing of which delimits a cavity opening to the outside via at least one orifice, characterized in that the hollow component is sealed, if appropriate, this orifice in the hollow component is connected to a source of fluid, the component so connected is submerged in a specific volume of an incompressible liquid, the cavity of the hollow component is filled with this fluid, the fluid in the cavity is pressurized, and the variation in volume of the liquid resulting from the deformations of the component casing which are caused by the set pressure of the fluid prevailing in it is measured.

2. Method according to claim 1, characterized in that the liquid is degassed.

3. Method according to claim 2, characterized in that the liquid is water.

4. Method according to claim 3, characterized in that the fluid is air.

5. Method according to claim 1, characterized in that the variation in volume is measured as a result of the movement of the level of a head of liquid.

6. Equipment for evaluating the sound emission property of a hollow component, the casing of which delimits a cavity opening to the outside via at least one orifice, characterized in that said equipment comprises a substantially nondeformable tank (10) of specific volume and sealed relative to liquid, a pressurized-fluid supply (30) passing through said tank (10) and equipped with a connector (31) to be connected to said orifice for providing set fluid pressures in said cavity, a liquid delivery (20) for filling said tank (10) with an incompressible liquid and for emptying the tank, and a sensor (40) for detecting the variation in volume of the liquid in the tank resulting from the deformations of the component casing which are caused by set pressures of the fluid prevailing in the cavity when the casing is submerged in the liquid filling said tank.

7. Equipment according to claim 6, characterized in that the tank has at least one transparent side wall.

8. Equipment according to claim 7, characterised in that the tank (10) is surmounted by a cover (11) fastened sealingly to the tank.

9. Equipment according to claim 8, characterized in that the cover (11) has an apex, and in that the sensor (40) is fastened to the apex.

10. Equipment according to claim 9, characterized in that this sensor (40) is a liquid-head pressure gauge.

11. Equipment according to claim 6, characterized in that the liquid is degassed water.

12. Equipment according to claim 11, characterized in that the pressurized fluid is air.

13. Equipment for evaluating the sound emission property of a hollow component, the casing of which delimits a cavity opening to the outside via at least one orifice, characterized in that said equipment comprises a substantially nondeformable tank (10) of specific volume and sealed relative to liquid, a pressurizedfluid supply (30) passing through said tank (10) and equipped with a connector (31) to be connected to said orifice for providing set fluid pressures in said cavity, a liquid delivery (20) for filling said tank (10) with an incompressible liquid and for emptying the tank, and a sensor (40) for detecting the variation in volume of the liquid in the tank resulting from the deformations of the component casing which are caused by set pressures of the fluid prevailing in the cavity when the casing is submerged in the liquid filling said tank; and in that the fluid supply (30) possesses a flow regulator (32) for varying in stages the pressure which is made to prevail in the cavity of the hollow component (50).

* * * * *